United States Patent [19]

Flagg

[11] 4,040,638
[45] Aug. 9, 1977

[54] REFUSE COLLECTING AND CONVEYING VEHICLE

[76] Inventor: Raymond C. Flagg, P.O. Box 1692, Medford, Oreg. 97501

[21] Appl. No.: 682,759

[22] Filed: May 3, 1976

[51] Int. Cl.² .............................................. B62B 13/18
[52] U.S. Cl. ......................................... 280/9; 248/99; 280/47.26
[58] Field of Search .................. 280/47.35, 79.3, 47.24, 280/79.2, 47.26, 9; 248/95, 97, 98, 99; 220/63 R

[56] References Cited

U.S. PATENT DOCUMENTS

| | | | |
|---|---|---|---|
| 2,624,588 | 1/1953 | Jones | 280/9 |
| 3,556,395 | 1/1971 | Herman | 248/97 |
| 3,807,598 | 4/1974 | Nutt | 248/99 |
| 3,836,037 | 9/1974 | Bass | 220/63 R |
| 3,893,615 | 7/1975 | Johnson | 248/95 |

*Primary Examiner*—Robert R. Song
*Attorney, Agent, or Firm*—Clarence M. Crews

[57] ABSTRACT

A refuse collecting vehicle includes the following features: A rigid frame is provided having a handle at one end and a choice of runners, snow skid or wheel, at the other. The frame includes means for supporting a plastic bag in position to receive refuse. An unitary water-tight cover is provided for the bag which can be swung between bag covering and uncovering positions. Mechanism responsive to operation of the cover causes the bag mouth to be wide open when the cover is in uncovering position and to be closed when the cover is in covering position. The frame is open at one side to facilitate removal of a filled bag and the substitution of an empty one. Provision is made for supporting a filled and closed bag in a carrying position and affixing it to the frame for transportation.

7 Claims, 8 Drawing Figures

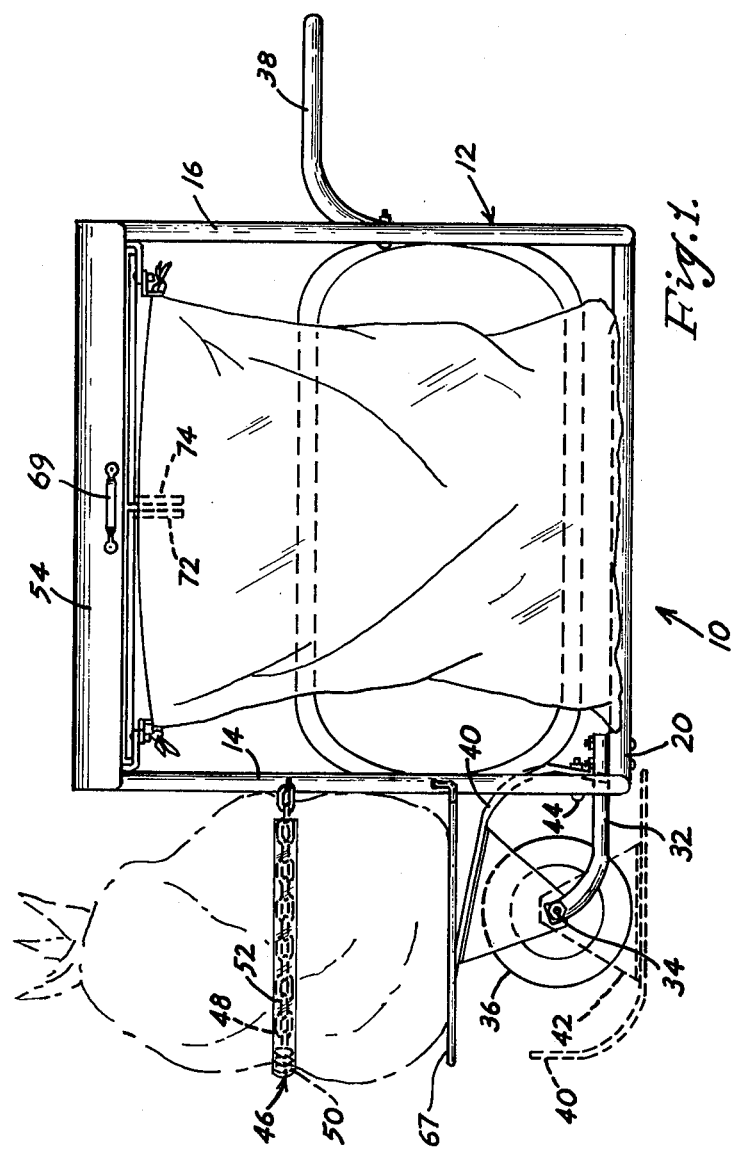
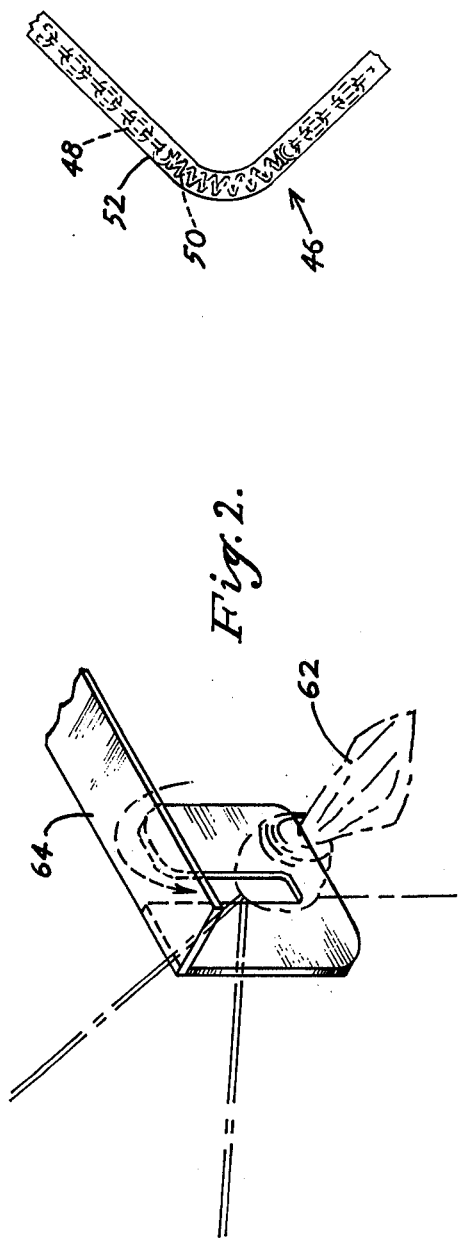

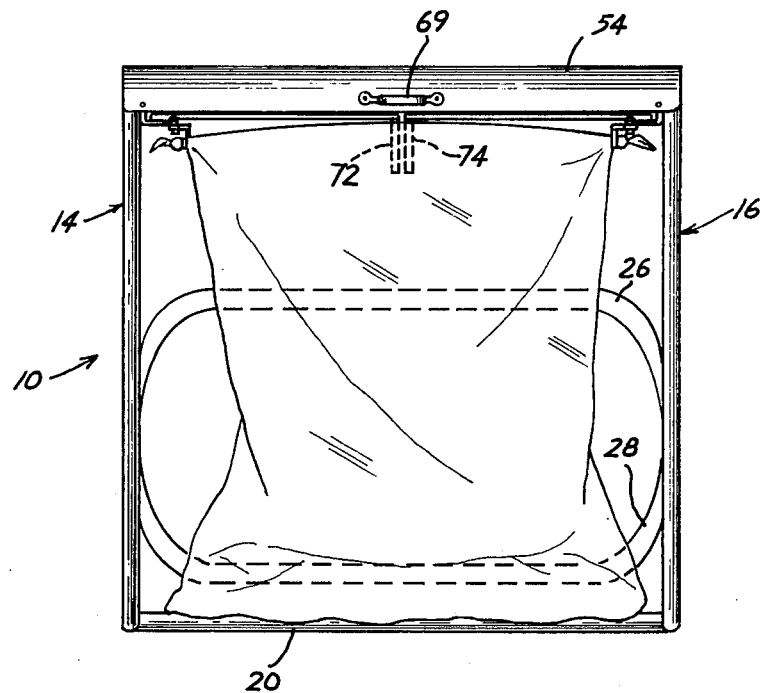
Fig. 6.
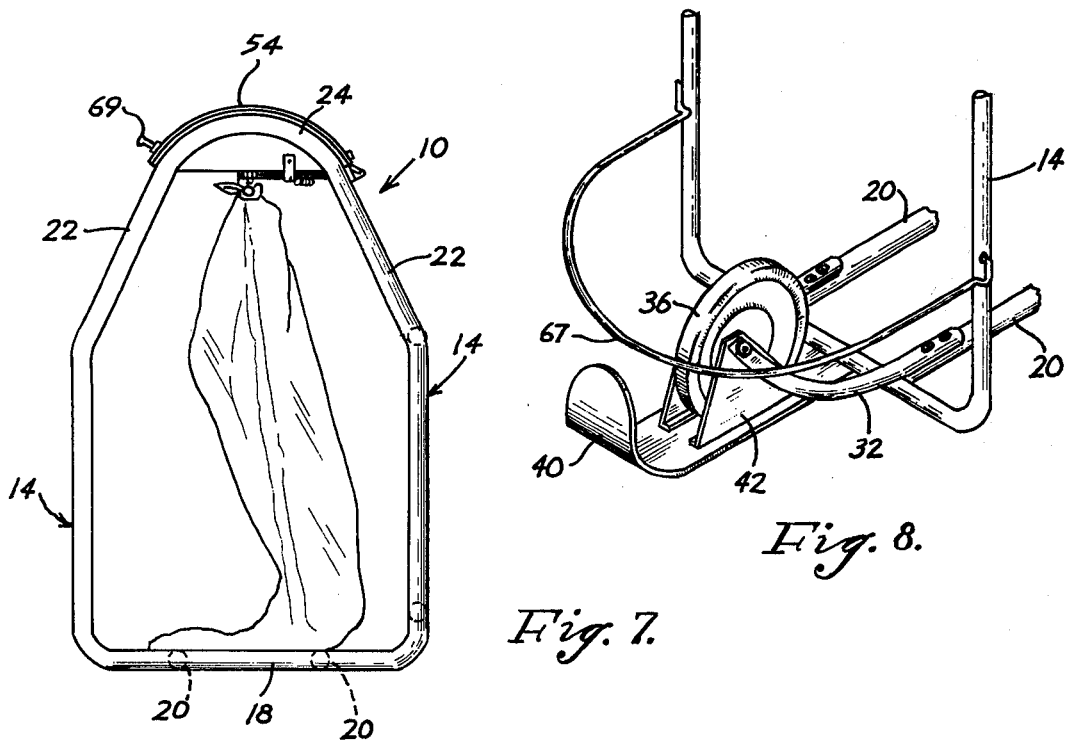
Fig. 7.
Fig. 8.

REFUSE COLLECTING AND CONVEYING VEHICLE

In connection with every home there is the need to collect and to store for a time refuse which may consist in part of table scraps, kitchen scraps and other garbage or trash from indoors, together with fallen leaves, nuts, fruits, weeds and the like from outdoors.

For collecting the indoor refuse a receptive collection bag stationed just outside the kitchen door is satisfactory, but for collecting the outdoor refuse it is desirable to provide a collection bag carrying vehicle which can be moved about the yard conveniently in fair weather or foul.

In any event, an inexpensive collection bag is generally preferable to a collection can because the bag is picked up and carried away for destruction along with the refuse, there being nothing in the way of parasites or rotting food left over from one collection to the next.

A bag transporting machine is highly desirable for another reason. The refuse disposal agencies ordinarily either refuse altogether to pick up refuse from beside the kitchen door, or double the disposal fee if the refuse is not placed at the curb in front of the house.

It is accordingly a primary object of the present invention to provide a simple, sturdy, portable vehicle not only suitable for collecting outdoor refuse and for collecting indoor refuse into an expendable bag, but also for conveying filled bags from the kitchen door area to a designated pick-up point.

To the above ends the bag carrier desirably includes a skeletonized framework composed of hollow tubing within which a bag may be suspended, mouth upward.

It is a feature that the bag suspending means includes a rockable unitary cover, mounted on the frame, which may be lodged in a bag covering position or in a bag uncovering position. Bag mouth spreading and closing means, controlled through the cover, is caused to spread the bag mouth widely when the cover is in uncovering position but to close the bag mouth when the cover is in covering position.

It is a further feature that the frame includes an operating handle at one end and a choice of runners, a wheel and a snow skid, at the other. In good weather conditions the snow skid stands above the wheel so that the wheel serves as the active runner, but if there is snow or ice on the ground the skid may be turned into a position beneath the wheel to become the active runner.

It is a still further feature that a bag support is provided at the front of the machine to receive for transportation a bag which has been filled, and tied closed. To this end a combined spring, chain and sheath is mounted on the forward end of the frame to hold the filled bag securely in place.

Other objects and advantages will hereinafter appear.

In the drawing forming part of this specification:

FIG. 1 is a view in side elevation of an illustrative, preferred form of refuse collecting and transporting vehicle showing a filled and closed plastic refuse bag secured on the front of a preferred form of the vehicle and a second bag mounted in refuse-loading position;

FIG. 2 is a detail view showing how one of two opposed bag knots is anchored for retaining the mount of a bag in loading position;

FIG. 3 is a detail, fragmentary view of a combined chain, spring and sheath unit for holding a filled and closed bag on the vehicle;

FIG. 6 is a view in side elevation of the vehicle with vehicle handles and runners omitted;

FIG. 7 is a view in end elevation of the structure shown in FIG. 6; and

FIG. 8 is a fragmentary view in perspective showing particularly the runners and a bag carrying support.

Figure 4:
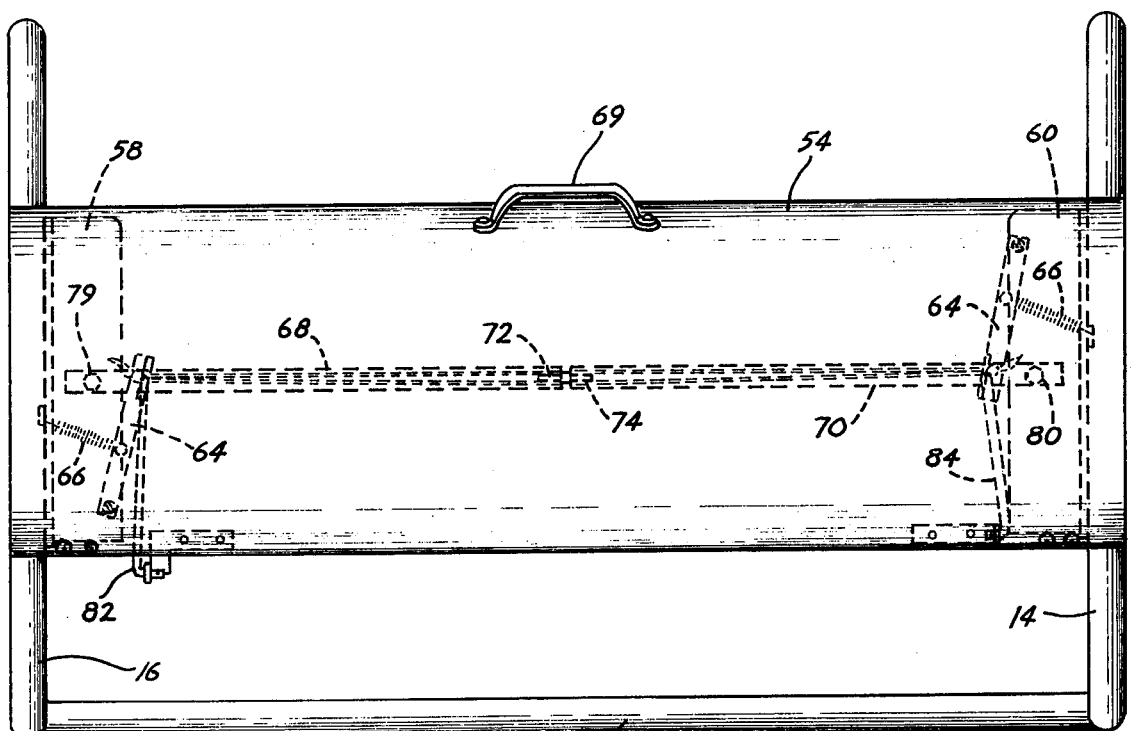
FIG. 4 is a plan view of the vehicle with the handle and runners omitted and the cover closed.

A loading, transporting and storing vehicle 10 comprises a rigid frame 12 which is composed of light hollow tubular members, suitably secured in fixed relation to one another. The frame comprises front and rear parallel, transverse loops 14 and 16 which are desirably identical with one another. The loops 14 and 16 have straight bottom portions 18 which are fixedly connected in parallel relation to one another by bottom parallel frame members 20,20. As best seen in FIG. 6, each front and rear frame member also includes parallel upstanding side portions and convergent upper portions 22,22 which merge with one another through an integral arcuate portion 24.

On one side the members 14 and 16 are rigidly and fixedly connected to one another by rigid tubular members 26 and 28. On the opposite side the members 14 and 16 are unconnected to one another, the space being left open so that an empty bag can be conveniently put into place and a filled bag can be conveniently withdrawn.

At the forward end a bottom horizontal portion of the frame member 14 has rigidly affixed to it a pair of fixed, forwardly extending, upwardly inclined, convergent bearing arms 32. A bearing shaft 34 is jointly supported by the arms 32. The shaft 34 has mounted upon it alternatively usable runners. One of the runners consists of a rubber tired wheel 36 which desirably just touches level ground when the bottom frame members 20,20 rest on the ground.

A handle member 38 is rigidly attached to the frame members 16 and extends rearwardly from them. Lifting of the handle member 38 takes the members 20 off of the ground, dividing the weight of the entire device between the handle 38 and the runner wheel 36.

The other runner 40 takes the form of a normally inactive snow skid, the runner being inactive in the full line position of FIG. 1. The runner 40 has integral ears 42 which bear upon the shaft 34 and support the skid somewhat farther out from the shaft 34 than the periphery of the wheel 36. The runner 40 is normally attached to the member 14 in the full line position of FIG. 1 by a screw and wing nut combination 44. When detached from 14 and turned through approximately a half turn about the axis of 34, the runner takes the wheel 36 out of contact with the ground, as indicated in broken lines in FIG. 1. The skid 40 now becomes the active runner, a useful substitute if there is snow or ice on the ground.

A filled and tied closed bag may be set on a member 67 and held to the frame member 14 by a combined chain, spring and sheath device 46. The device 46 comprises chain segments 48 secured to respective upright portions of frame member 14 and to an interposed spring 50, together with a bag protective chain and spring enclosing sheath 52.

Provision is made of an unitary protective metallic cover 54. The cover is hingedly supported through aligned hinges 56 from front and rear angle members 58 and 60, which angle members are affixed respectively to 14 and 16. Provision is made of means for causing the mouth of a bag in loading position to be closed as an incident of moving the cover to a covering position and to be opened widely as an incident of moving the cover to an uncovering position.

The bag to be loaded has two knots 62 tied in it by the operator at diametrically opposed corners of its mouth. The knots serve to provide opposed anchorages for the bag corners in slotted levers 64 which are pivotally mounted on the respective angle members 58 and 60. The levers 64 are urged to the positions illustrated in FIG. 4 by tension coil springs 66 when the cover 54 is in closed position, but are drawn to the positions illustrated in FIG. 5 when the cover is opened. The opening of the cover not only draws the knotted corners of the bag mouth toward one another against the resistance of the springs 66, but it spreads the bag mouth to the shape illustrated in FIG. 4.

Figure 5:
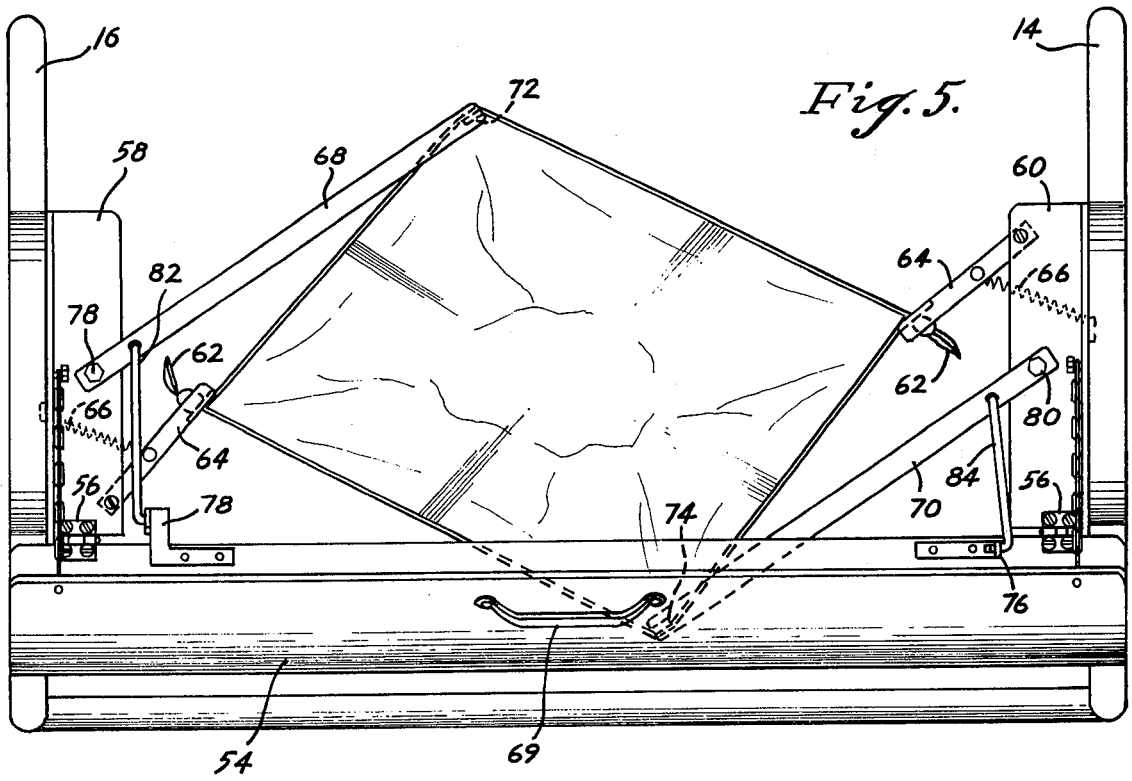
FIG. 5 is a plan view similar to FIG. 4 but showing parts in the position assumed by them when the cover is moved to uncovering position.

The cover is provided with a handle 69 whereby it may be swung between the closed condition of FIG. 4 and the open condition of FIG. 5. For spreading the bag mouth levers 68 and 70 are pivotally mounted on the angle bars 58 and 60 and have affixed to their free ends downwardly extending, bag mouth spreading pins 72 and 74. When the cover is in the closed position the spreading pins 72 and 74 lie closely adjacent to one another and, under the influence of the springs 66, the bag mouth is essentially closed. This is the normal condition whenever the vehicle is parked, either by the kitchen door, at the curb, or elsewhere.

When access to the mouth of the active bag is desired, however, the cover 54 is swung by the handle 68 to the open condition and this has the effect of opening the mouth of the bag widely. The manner in which this desirable result is brought about should not go unnoticed.

The common axis of the hinges 56 about which the cover turns desirably coincides essentially with one edge of the cover. By making the ear 76 terminate short of that edge and the ear 78 extend across and beyond that edge by a like amount, levers 68 and 70 are caused to be swung away from one another about their respective pivots 79 and 80, by links 82 and 84, desirably being maintained in parallelism as shown, and causing the bag mouth to be maintained in the form of a parallelogram. A terminal condition is illustrated in FIG. 5. When the cover is returned to the covering position the parts are returned to the condition illustrated in FIG. 4 by the springs 66.

When a bag has been filled and tied off, it may be set on the ground by the kitchen door temporarily. On pick-up day a loaded bag or bags may be put one by one on the bag support 67 which normally extends horizontally forward over the runners but can be swung up out of the way when it is desired to shift the skid. A bag supported on support 67 can be bound in place by the device 46, and carried to the pick-up station for unloading there. At the same time one or more filled and closed bags can be carried on the frame members 20. The support 67 takes the form of a tubular metallic loop having outturned ends which normally bear against forward face portions of the frame member 14. The extremities of 67 extend rearward, then upward and finally inward to penetrate vertical portions of member 14.

I have described what I believe to be the best embodiment of my invention. What I desire to cover by letters patent, however, is set forth in the appended claims.

I claim:

1. A manually operable, ground supported refuse collecting and transporting vehicle comprising, in combination,
   a. a rigid bag supporting frame,
   b. means for supporting the bag, open end up, within the frame,
   c. an unitary, rigid bag cover pivotally mounted on the frame with freedom for movement in its entirety, about a single laterally offset axis, between bag covering and uncovering positions, and
   d. horizontally operative bag mouth opening and closing means responsive to operation of the unitary bag cover to spread the bag mouth as an incident of uncovering the bag and to close the bag mouth as an incident of covering the bag.

2. A refuse collecting and transporting vehicle as set forth in claim 1 in which the unitary cover is pivotally connected at its front and rear ends and at a common side of center, to front and rear, laterally offset portions of the frame.

3. A refuse collecting and transporting vehicle as set forth in claim 2 in which chains connect front and rear free corners of the unitary cover to the frame for limiting movement of the cover in uncovering direction.

4. A refuse collecting and transporting vehicle as set forth in claim 1 in which the frame is open at one side to facilitate the withdrawal of a filled bag and the replacement of the filled bag by an empty bag.

5. A manually operable refuse collecting and transporting vehicle as set forth in claim 1 in which runner means are provided which include forwardly projecting, fixed runner bearing arms at the forward end of the machine, a bearing carried jointly by said arms, a wheel revolubly carried by said bearing and a snow skid also carried by said bearing, means retaining the snow skid in an inactive raised condition in good weather so the wheel can engage the ground and be the active runner with the skid disposed above the wheel, but the skid may be released and then swung around to extend beneath the wheel and become the active runner in snowy or icy weather.

6. A manually operable refuse collecting and transporting vehicle as set forth in claim 5 in which a bag support extends forward from the frame and overlies the wheel and skid, the bag support being pivotally mounted on the frame with freedom for upward movement to provide clearance for the described adjustment of the skid, but including means for limiting downward movement of the bag support to the normal bag supporting position.

7. A manually operable refuse collecting and transporting vehicle as set forth in claim 6 in which a flexible bag retaining member, detachably carried by opposed members at the front of the vehicle may be passed around a filled bag on the bag support for holding the bag in fixed position on the filled bag support.

* * * * *